United States Patent [19]
Onan et al.

[11] Patent Number: 5,383,521
[45] Date of Patent: Jan. 24, 1995

[54] FLY ASH CEMENTING COMPOSITIONS AND METHODS

[75] Inventors: David D. Onan, Lawton; Dralen T. Terry; Bobby G. Brake, both of Duncan, all of Okla.

[73] Assignee: Halliburton Company, Duncan, Okla.

[21] Appl. No.: 41,745

[22] Filed: Apr. 1, 1993

[51] Int. Cl.$^6$ ............................................. E21B 33/13
[52] U.S. Cl. ................................. 166/293; 106/705; 106/708; 106/709; 106/DIG. 1; 405/263; 405/266
[58] Field of Search ................ 166/293, 292; 106/705, 106/708, 709, DIG. 1; 405/263, 266

[56] References Cited

U.S. PATENT DOCUMENTS

| | | |
|---|---|---|
| Re. 30,943 | 5/1982 | Nicholson . |
| 2,646,360 | 7/1953 | Lea ................................. 166/293 X |
| 3,359,225 | 12/1967 | Weisend .......................... 252/8.551 |
| 3,676,541 | 7/1972 | Nishi et al. ..................... 106/708 X |
| 3,832,196 | 8/1974 | Broussard et al. . |
| 3,876,005 | 4/1975 | Fincher et al. ................. 166/293 X |
| 4,210,457 | 7/1980 | Dodson et al. . |
| 4,374,672 | 2/1983 | Funston et al. . |
| 4,385,935 | 5/1983 | Skjeldal ........................... 166/292 X |
| 4,624,711 | 11/1986 | Styron ............................. 106/405 |
| 4,635,724 | 1/1987 | Bruckdorfer et al. ............ 166/268 |
| 4,731,120 | 3/1988 | Tuutti ............................... 106/705 |
| 4,770,708 | 9/1988 | Atkins et al. ..................... 106/708 |
| 4,772,330 | 9/1988 | Kobayashi et al. .............. 106/400 |
| 4,818,288 | 4/1989 | Aignesberger et al. ....... 166/293 X |
| 4,997,484 | 3/1991 | Gravitt et al. ................... 106/708 |
| 5,018,906 | 5/1991 | Bonier-Sahuc .................. 405/263 |
| 5,049,288 | 9/1991 | Brothers et al. ................ 252/8.551 |
| 5,058,679 | 10/1991 | Hale et al. ........................ 166/293 |
| 5,084,102 | 1/1992 | Brouns et al. ................ 106/705 X |
| 5,106,423 | 4/1992 | Clarke ............................. 106/789 |
| 5,125,455 | 6/1992 | Harris et al. .................... 166/292 |
| 5,223,035 | 6/1993 | Hopkins et al. ............. 106/709 X |

FOREIGN PATENT DOCUMENTS

| | | |
|---|---|---|
| 0163459 | 12/1985 | European Pat. Off. . |
| 0572261A1 | 12/1993 | European Pat. Off. . |

*Primary Examiner*—George A. Suchfield
*Attorney, Agent, or Firm*—Robert A. Kent; C. Clark Dougherty, Jr.

[57] ABSTRACT

The present invention provides fly ash cementing compositions and methods which are useful in any cementing application, and are particularly suitable for cementing in subterranean zones penetrated by well bores. The cementing compositions can include a portion of the drilling fluid used to drill a well bore as a component thereof. Also, drilling fluid can be disposed of by combining it with the fly ash cementing composition whereby it solidifies in a disposal location.

24 Claims, No Drawings

FLY ASH CEMENTING COMPOSITIONS AND METHODS

BACKGROUND OF THE INVENTION

1. Field of the Invention

The present invention relates to improved fine particle size cementing compositions which can be utilized in general construction as well as in cementing wells.

2. Description of the Prior Art

In general cementing operations wherein hard substantially impermeable cementitious masses are formed in desired locations, hydraulic cement compositions have heretofore been utilized which contain relatively large particle size hydraulic cements, e.g., Portland cements, along with water and other additives.

In specialized cementing operations such as those carried out in constructing and repairing oil, gas and water wells, large particle size cement compositions have also been utilized. In primary well cementing, i.e., the forming of a cement sheath in the annular space between pipe disposed in a well bore and the walls of the well bore, a pumpable hydraulic cement composition is introduced into the annular space and the cement composition is permitted to set therein. The resulting cement sheath provides physical support and positioning to the pipe in the well bore and prevents unwanted fluid migration between subterranean zones and formations penetrated by the well bore.

After a well has been utilized in the recovery of fluids from or the introduction of fluids into subterranean formations, problems relating to the undesirable passage of fluids into and from subterranean formations or the well bore penetrating such formations sometimes occur. This undesirable passage of fluids ordinarily involves the flow of oil, gas or water through small openings such as holes or cracks in well casings; holes, cracks, voids or channels in the cement sheath in the annular space between the walls of the well bore and the pipe therein; very small spaces between the cement sheath and the exterior surface of the casing or the walls of the well bore; and permeable spaces in gravel packs and formations. Heretofore, such openings have been plugged or attempted to be plugged using cement compositions of relatively large particle size. As a result, when the openings are very small, it is difficult to cause the cement composition of relatively large particle size to enter the openings and set therein whereby the openings are plugged. If the cement composition utilized cannot enter the openings, at best a bridge or patch may be formed over the openings to produce only a temporary termination of the undesirable fluid flow.

Recently, fine particle size cement compositions have been used successfully in the construction and repair of wells. Such fine particle size cement compositions and methods of their use are described in detail, for example, in U.S. Pat. Nos. 5,086,850 entitled Squeeze Cementing issued Jun. 16, 1992 and No. 5,125,455 entitled Primary Cementing issued on Jun. 30, 1992. Because of the fine particle size of the cement, the cement compositions can readily be forced into and through very small openings, they can have low densities and they quickly develop gel strength after placement. However, fine particle size Portland and other cements are expensive, and the cement compositions utilizing such cements have often suffered from poor compressive strength development at low temperatures.

A variety of drilling fluids are used in drilling wells. Generally, the drilling fluids are solids containing water base gels or hydrocarbon based fluids which can be non-weighted or weighted with particulate weighting materials such as barite. After a well bore is drilled, during which the drilling fluid used is circulated through the well bore, circulation of the drilling fluid is stopped while the well is logged and pipe is run in the well bore. The drilling fluid in the well bore is then conditioned by circulating drilling fluid downwardly through the interior of the pipe and upwardly through the annulus between the exterior of the pipe and the walls of the well bore while drilling solids and gas are removed therefrom. Primary cementing operations are then performed in the well bore, i.e., the pipe disposed in the well bore is cemented therein by placing a cement composition in the annulus between the pipe and the walls of the well bore. When the cement composition is pumped down the pipe and into the annulus, the drilling fluid in the pipe and the annulus is displaced therefrom. The used drilling fluid is generally accumulated in a pit or tank and then disposed of.

The disposal of drilling fluid is time consuming and expensive, particularly in offshore drilling locations, and the drilling fluid often must be disposed of as a fluid which is hazardous to the environment. Thus, any environmentally safe use to which all or part of the drilling fluid can be put at the well site is highly advantageous in that it eliminates the need for disposal of the drilling fluid so used.

There remains a need in cementing applications, and particularly in the construction and repair of oil, gas and water wells for fine particle size cementing compositions and methods wherein the compositions are relatively inexpensive and have good compressive strength development at low temperatures. In addition, there is a need for such fine particle size cementing compositions and methods wherein the compositions can contain drilling fluid. That is, there is a need for cementing compositions and methods wherein portions of the drilling fluids used to drill wells can be utilized as components in the cementing compositions used for carrying out cementing operations in the wells, e.g., primary cementing operations. The portions of the drilling fluids which are not utilized in the cementing operations can be disposed of by combining them with the cementing compositions and forming the resulting cementing composition-drilling fluid mixtures into hard environmentally safe cementitious masses in underground or other locations.

SUMMARY OF THE INVENTION

The present invention provides relatively inexpensive fine particle size cementing compositions and methods which meet the needs recited above and overcome the shortcomings of the prior art. The fine particle size cement compositions are basically comprised of fine particle size ASTM Class C or equivalent fly ash wherein the particles are of a size no greater than about 36 microns and have a specific surface area no less than about 1.1 square meters per cubic centimeter and sufficient water to form a slurry.

The compositions preferably also include a dispersing agent for facilitating the dispersal of the fly ash particles in the water and maintaining them in suspension therein. A preferred such dispersing agent is comprised of the condensation polymer product of formaldehyde, acetone and sodium sulfite. The compositions can also include a set delaying additive for increasing the time in which the compositions set.

The cementing compositions of this invention can include drilling fluid as a component thereof whereby at least a portion of the drilling fluid used for drilling a well can be consumed in cementing operations carried out therein and remaining drilling fluid can be combined with additional cementing composition and disposed of by solidification in a safe location.

It is, therefore, a general object of the present invention to provide improved fine particle size cementing compositions and methods of their use.

Other and further objects, features and advantages of the present invention will be readily apparent to those skilled in the art upon a reading of the description of preferred embodiments which follows.

DESCRIPTION OF PREFERRED EMBODIMENTS

The improved cementing compositions of this invention utilize a readily available inexpensive fine particle size ASTM Class C or the equivalent fly ash as the principal cement component. The cement compositions including such fly ash have a low heat of hydration and provide high early compressive strength development at relatively low temperatures.

The fine particle size cementing compositions and methods of this invention are useful in any cementing application wherein it is desirable to form a hard substantially impermeable cementitious mass in a desired location either above or below ground level. However, the compositions and methods are particularly suitable in performing cementing operations in the construction and repair of oil, gas and water wells. In primary cementing whereby a cement sheath is formed in the annular space between a pipe disposed in a well bore and the walls of the well bore, a pumpable cementing composition is introduced into the annular space and the composition is permitted to set therein. The resulting cement sheath provides physical support and positioning to the pipe in the well bore and prevents undesirable fluid migration between subterranean zones and formations penetrated by the well bore. The improved inexpensive fine particle size fly ash cementing compositions of this invention are particularly suitable for performing primary cementing operations, and as will be described further hereinbelow, can incorporate as a component thereof a portion of the drilling fluid utilized in drilling a well.

The cementing compositions and methods of this invention are also suitable in matrix cementing, also known as squeeze cementing, wherein small openings such as holes or cracks in pipe, cement, rock formations and the like are plugged. The fine particle size and rapid low temperature compressive strength development properties as well as the relatively low cost of the cementing compositions makes them particularly advantageous in matrix cementing operations.

As mentioned above, at least a portion of the drilling fluid used in drilling a well can be utilized as a component in a cementing composition of this invention used for carrying out primary cementing operations in the well. The portion of the drilling fluid which is not utilized in the primary cementing of the well can be combined with additional cementing composition of this invention and disposed of by solidification into an environmentally safe cementitious mass in a safe location.

The improved cement compositions of this invention are basically comprised of fine particle size ASTM Class C or the equivalent fly ash and sufficient water to form a slurry. The compositions can also include a dispersing agent for facilitating the dispersal of the fly ash particles in the water and maintaining the particles in suspension therein as well as a set delaying additive for increasing the time in which the composition sets. A variety of other additives which are well known to those skilled in the art can also be included in the compositions.

Fly ash is the finely divided residue that results from the combustion of ground or powdered coal and is carried by the flue gases generated. The particular fly ash that is useful in accordance with the present invention is a fine particle size ASTM Class C or the equivalent fly ash which itself contains sufficient lime to form a cementitious mass in the presence of water. The particle size of the fly ash is such that the particles have diameters no larger than about 36 microns, preferably no larger than about 15 microns and still more preferably no larger than about 10 microns. The distribution of various size particles within the fly ash should be such that about 90% of them have diameters no greater than about 22 microns, preferably about 20 microns and still more preferably about 18 microns, 50% have diameters no greater than about 12 microns, preferably about 10 microns and still more preferably about 8 microns and 20% of the particles have diameters no greater than about 7 microns, preferably about 5 microns and still more preferably about 3 microns. In addition, the surface area of the particles expressed in square meters per cubic centimeter should be no less than about 1.0, preferably no less than about 1.2, and most preferably no less than about 1.4 square meters per cubic centimeter. The surface area expressed in square centimeters per gram, known as Blaine fineness, should be no less than about 4000, preferably no less than about 4800, and most preferably no less than about 5600 square centimeters per gram.

A particularly suitable fine particle size fly ash classified as an ASTM Class C fly ash has the approximate physical properties set forth in Table I below.

TABLE I

Physical Properties of Fine Particle Size ASTM Class C Fly Ash

| | |
|---|---|
| Appearance: | Light tan to mustard |
| Specific Gravity[1]: | 2.46 |
| Average Bulk Density[2]: | 77 lb/cu. ft. |
| Absolute Volume Factor: | 0.0487 |
| Average Particle Size: | 9 microns |
| Maximum Particle Size: | 36 microns |
| Percent Under 8.0 microns: | 40% |
| Specific Surface Area: | Range: 1.15–1.63 $m^2$/cc |
| Normal Water Requirement[3]: | 40% |

[1] Specific gravity determination by Beckman air compression pycnometer.
[2] Apparent bulk density determination (ASTM C110 Part 15 & 16).
[3] API Specification for Materials and Testing for Well Cements, Fifth Edition, July 1, 1990, page 42, Appendix B, Section B1; "Determination of Normal and Minimal Water Content of Slurry".

The oxide analysis of the ASTM Class C fly ash having the above physical properties is set forth in Table II below.

TABLE II

Oxide Analysis of Fine Particle Size Fly Ash

| Component | Percent by Weight |
|---|---|
| Aluminum Oxide ($Al_2O_3$) | 16.78 |
| Silicon Dioxide ($SiO_2$) | 31.47 |
| Iron Oxide ($Fe_2O_3$) | 7.09 |
| $Al_2O_3$ + $SiO_2$ + $Fe_2O_3$ | 55.34 |
| Calcium Oxide (CaO) | 29.91 |

TABLE II-continued

Oxide Analysis of Fine Particle Size Fly Ash

| Component | Percent by Weight |
|---|---|
| Sulfur Trioxide (SO$_3$) | 3.39 |
| Magnesium Oxide (MgO) | 6.18 |
| Titanium Dioxide (TiO$_2$) | 1.37 |
| Potassium Oxide (K$_2$O) | 0.45 |
| Sodium Oxide (Na$_2$O) | 1.36 |
| Total Alkali (K$_2$O × .658 + Na$_2$O) | 1.65 |
| Strontium Oxide (SrO) | 0.48 |
| Barium Oxide (BaO) | 0.96 |
| Manganese Oxide (MnO) | 0.05 |
| Loss on Ignition (LOI) | 0.52 |
| Free Lime (ASTM) | 0.60 |
| Borate Content | 0 |

A cementing composition of this invention is formed by mixing the fine particle size ASTM Class C fly ash described above or the equivalent thereof with sufficient water to form a slurry comprised of the fly ash in an amount in the range of from about 65% to about 80% by weight of the composition and water in an amount in the range of from about 20% to about 35% by weight of the composition. The cementing composition sets into a hard substantially impermeable cementitious mass in a time period at ambient conditions in the range of from about 2 hours to about 12 hours, and as stated above, provides high early compressive strength at temperatures as low as 60° F., e.g., a compressive strength in the range of from about 200 psi to about 3000 psi in a time period of from about 24 hours to about 72 hours. Because of the fine particle size of the fly ash and its ability to form a cementitious mass in the presence of water without the addition of lime or the like, the fly ash is very reactive, has a low heat of hydration and provides the high early compressive strength mentioned above.

A preferred cementing composition of the present invention includes, in addition to the fine particle size fly ash and water, a dispersing agent for facilitating the dispersal of the fly ash particles in the water and maintaining the particles in suspension therein. While a variety of dispersing agents can be utilized, a particularly suitable such dispersing agent is the condensation polymer product of an aliphatic ketone, an aliphatic aldehyde and a compound which introduces acid groups into the condensation polymer. Such a dispersing agent is disclosed in U.S. Pat. No. 4,818,288 issued Apr. 4, 1989 to Aignesberger et al. A particularly preferred such dispersing agent is comprised of the condensation polymer product of acetone, formaldehyde and sodium sulfite.

Another suitable dispersing agent for use in accordance with this invention is a blend of polyvinylpyrrolidone and the condensate of sodium naphthalene sulfonate with formaldehyde. This dispersing agent is described in U.S. Pat. No. 3,359,225 issued on Dec. 19, 1967 to Weisend.

Yet another suitable dispersing agent is the blend of polyvinylpyrrolidone and the condensate of sodium naphthalene sulfonate with formaldehyde described above mixed with a metal lignosulfonate salt.

Other suitable dispersing agents for use in accordance with this invention are gluconic acid delta lactone and naphthalene sulfonic acid.

When a dispersing agent is utilized in the cementing composition, it is generally included therein in an amount in the range of from about 0.25% to about 1% by weight of fine particle size fly ash in the composition.

Another additive which is commonly used in cementing compositions is a set delaying additive for increasing the time in which the cementing composition sets. Set delaying additives are often required to be used in well cementing operations in order to allow enough pumping time for the cementing composition to be placed in the subterranean zone to be cemented.

A variety of set delaying additives can be utilized in accordance with this invention such as ammonium and other metal lignosulfonate salts, e.g., ammonium lignosulfonate, calcium lignosulfonate, sodium lignosulfonate and the like, the copolymer of "AMPS ®" (2-acrylamido-2-methyl propyl sulfonic acid) and acrylic acid described in U.S. Pat. No. 5,049,288 issued Sep. 17, 1991 to Brothers, et al., tartaric acid, citric acid, trisodium citrate, gluconic acid, potassium pentaborate, potassium perborate, aminotri(methylene phosphonic) acid and mixtures of two or more of such set delaying additives.

Preferably the set delaying additive is a lignosulfonate salt, most preferably ammonium lignosulfonate, present in the cementing composition in an amount in the range of from about 0.1% to about 4% by weight of the composition. The lignosulfonate salts can be obtained commercially in aqueous solutions containing lignosulfonate salt in an amount in the range of from about 40% to about 60% by weight of the solution.

A cementing composition of this invention for cementing in a subterranean zone penetrated by a well bore is preferably comprised of a fine particle size ASTM Class C or equivalent fly ash wherein the particles are of a size no greater than about 36 microns and have a specific surface area no less than about 1.1 square meters per cubic centimeter (equivalent to a Blaine fineness of about 4400 square centimeters per gram), a dispersing agent for facilitating the dispersal of the fly ash particles in water and maintaining the particles in suspension therein and sufficient water to form a pumpable slurry. Depending upon the particular location and temperature of the zone to be cemented, the cementing composition can also include a set delaying additive for increasing the time in which the composition sets.

A particularly preferred set delayed cementing composition of this invention is comprised of a fine particle size ASTM Class C or equivalent fly ash wherein the particles are of a size no greater than about 36 microns and have a specific surface area in no less than about 1.1 square meters per centimeter (equivalent to a Blaine fineness of about 4400 square centimeters per gram), a dispersing agent comprised of the condensation polymer product of acetone, formaldehyde and sodium sulfite present in an amount in the range of from about 0.25% to about 1% by weight of the fly ash in the composition, a set delaying additive comprised of an ammonium lignosulfonate salt present in the composition in an amount in the range of from about 0.1% to about 4% by weight of the cementing composition and sufficient water to form a pumpable slurry.

The methods of the present invention for forming a hard substantially impermeable cementitious mass in a desired location are basically comprised of the steps of placing a cementing composition into the location which is comprised of the fine particle size ASTM Class C or the equivalent fly ash described above and sufficient water to form a slurry. The methods of cementing in a subterranean zone penetrated by a well bore of this invention basically comprise the steps of pumping a cementing composition comprised of the fine particle size ASTM Class C or equivalent fly ash described above, a dispersing agent of the type described above, and optionally, a set delaying agent described above and sufficient water to form a pumpable slurry into the subterranean zone to be cemented. After being placed in the zone, the cementing composition is permitted to set into a hard substantially impermeable mass therein.

As mentioned above, the cementing compositions of this invention can also include drilling fluid, and optionally, when higher compressive strength development is required, a fine particle size Portland cement can be included in the compositions.

The drilling fluid component of the cementing composition can be comprised of any aqueous hydrocarbon base drilling fluid so long as the drilling fluid doesn't contain compounds which adversely react with the other components of the cementing composition. Most commonly used water base gels and hydrocarbon base drilling fluids do not adversely react with the other components of the cementing composition of this invention. Generally, the drilling fluid is included in the cementing composition in an amount in the range of from about 10% to about 50% by weight of the composition.

The fine particle size Portland cement which is optionally included in the cementing composition to increase the compressive strength thereof is made up of particles having diameters no larger than about 30 microns, preferably no larger than about 17 microns and still more preferably no larger than about 11 microns. The distribution of various sized particles within the Portland cement is preferably such that 90% of the particles have a diameter no greater than about 25 microns, more preferably about 10 microns and still more preferably about 7 microns, 50% of the particles have a diameter no greater than about 10 microns, more preferably about 6 microns and still more preferably about 4 microns, and 20% of the particles have a diameter no greater than about 5 microns, more preferably about 3 microns and still more preferably about 2 microns. The specific surface area of the particles is preferably no less than about 1.5 square meters per cubic centimeter (equivalent to a Blaine fineness of about 6,000 square centimeters per gram), more preferably no less than about 1.75 square meters per cubic centimeter (7,000 square centimeters per gram) and most preferably no less than about 2.5 square meters per cubic centimeter (10,000 square centimeters per gram). Portland cement of particle size and fineness as set forth above is disclosed in U.S. Pat. No. 4,160,674 issued on Jul. 10, 1979 to Sawyer. When used, the fine particle size Portland cement is included in the cementing compositions of this invention in an amount in the range of from about 30% to about 100% by weight of fly ash in the compositions.

A cementing composition of this invention containing drilling fluid and used to perform well cementing operations or to solidify drilling fluid as a part of its disposal is basically comprised of the fine particle size ASTM Class C or equivalent fly ash described above, a dispersing agent, preferably the condensation polymer product of acetone, formaldehyde and sodium sulfite present in an amount in the range of from about 0.25% to about 1% by weight of the fly ash, drilling fluid present in an amount in the range of from about 10% to about 50% by weight of the composition and water in an amount sufficient to form a pumpable slurry. The composition can also optionally include the fine particle size Portland cement described above in an amount in the range of from about 30% to about 100% by weight of the fly ash in the composition, and a set delaying additive, preferably an ammonium lignosulfonate salt, present in the composition in an amount in the range of from about 0.1% to about 4% by weight of the composition.

The methods of this invention for cementing a well with a cementing composition containing a portion of the drilling fluid used to drill the well as a component of the cementing composition basically comprise the steps of forming a cementing composition of this invention containing drilling fluid as set forth above, introducing the resulting cementing composition into the well to be cemented or other location of use or disposal and permitting the composition to set into a hard mass.

In order to further illustrate the cementing compositions and methods of this invention, the following examples are given.

EXAMPLE 1

Cementing compositions of the present invention comprised of Class C fly ash having particles of a size no greater than about 36 microns and having a specific surface area no less than about 1.1 square meters per cubic centimeter (4400 square centimeters per gram), a dispersant comprised of the condensation polymer product of acetone, formaldehyde and sodium sulfite, water and various amounts of drilling fluid were prepared and tested for compressive strength in accordance with the *API Specification for Materials and Testing for Well Cements*, API Specification 10A, 21st Edition, dated Sep. 1, 1991, of the American Petroleum Institute, Washington, D.C. The results of these tests are set forth in Table III below.

TABLE III

| Fine Particle Size Class C Fly Ash Cementing Compositions With Various Amounts of Drilling Fluid | | | | | | | | | |
|---|---|---|---|---|---|---|---|---|---|
| Weight Parts | | | | | Compressive Strength - PSI | | | | |
| Fly Ash[1] | H$_2$O | Drilling Fluid[2] | Dispersing Agent | Density (lb/gal) | 80° F. 24 hr | 100° F. 24 hr | 120° F. 24 hr | 140° F. 24 hr | 200° F. 7 day |
| 100 | 50 | — | 1.0 | 13.80 | 780 | 765 | 250 | 175 | — |
| 100 | 50 | 10.6(10)[3] | 1.0 | 13.30 | 580 | 790 | — | — | — |
| 100 | 50 | 41.0(30)[3] | 1.0 | 12.30 | 290 | 390 | — | — | — |
| 100 | 50 | 95.7(50)[3] | 1.0 | 11.30 | 175 | 170 | — | — | — |
| 100 | 40 | 85.2(50)[3] | 1.0 | 11.60 | — | 250 | — | — | — |
| 100 | 30 | 74.6(50)[3] | 1.0 | 12.00 | — | 490 | — | — | — |
| 60 plus 40 parts of silica flour filler | 65 | — | 1.0 | 14.10 | 520 | — | — | 100 | — |
| 60 plus 40 parts of fine particle size | 65 | — | 1.0 | 14.10 | 600 | — | — | 400(505)[4] | 920 |

TABLE III-continued

Fine Particle Size Class C Fly Ash Cementing Compositions With Various Amounts of Drilling Fluid

| | Weight Parts | | | | Compressive Strength - PSI | | | | |
|---|---|---|---|---|---|---|---|---|---|
| Fly Ash[1] | H₂O | Drilling Fluid[2] | Dispersing Agent | Density (lb/gal) | 80° F. 24 hr | 100° F. 24 hr | 120° F. 24 hr | 140° F. 24 hr | 200° F. 7 day |
| sand filler (25μ) | | | | | | | | | |

[1]Source: Fritz Chemical Company
[2]Drilling Fluid: 8.8 lb. bentonite/gal. fresh water (30 grams bentonite/350 grams deionized water)
[3]Value in parenthesis = percent by volume
[4]Value in parenthesis = compressive strength in 72 hours From Table III it can be seen that the Class C fly ash cementing compositions of this invention provide high early compressive strengths at relatively low temperatures with and without drilling fluid.

EXAMPLE 2

A variety of cementing compositions comprised of the fine particle size Class C fly ash described herein, the fine particle size Portland cement described herein, a dispersant comprised of the condensation polymer product of acetone, formaldehyde and sodium sulfite and water were prepared with and without drilling fluid or fine particle size sand. The compressive strengths of the resulting set compositions were determined in accordance with the above mentioned API Specification 10A. The compositions that were tested and the results of the tests are set forth in Table IV below.

TABLE IV

Fine Particle Size Class C Fly Ash Plus Fine Particle Size Portland Cement With and Without Drilling Fluid

| | | Weight Parts | | | | | Compressive Strength @ 140° F. - PSI | | |
|---|---|---|---|---|---|---|---|---|---|
| Fly Ash[1] | Portland Cement | Water | Drilling Fluid[2] | Fine Particle Size Sand | Dispersing Agent | Density (lb/gal) | 24 hr | 48 hr | 72 hr |
| 100 | 5 | 72 | — | 42 | 0.5 | 14.00 | 510 | — | — |
| 100 | 10 | 60 | — | — | 0.5 | 13.60 | 715 | — | — |
| 100 | 10 | 77 | — | 44 | 0.5 | 13.95 | 745 | — | — |
| 100 | 20 | 89 | — | 48 | 0.5 | 13.85 | 700 | — | — |
| 100 | 30 | 80 | — | — | 0.5 | 13.40 | 950 | — | — |
| 100 | 40 | 90 | — | — | 0.5 | 13.30 | — | — | 1,070 |
| 100 | 40 | 90 | 152.0(50)[3,4] | — | 0.5 | 11.05 | — | 315 | 495 |
| — | 100 | 90 | — | — | 0.5 | 12.80 | 1,770 | — | — |
| 40 | 100 | 90 | — | — | 0.5 | 13.70 | 2,920 | — | — |
| 40 | 100 | 90 | 153.5(50)[3,5] | — | 0.5 | 11.45 | 135 | — | — |
| 50 | 100 | 90 | — | — | 0.5 | 13.90 | 2,600 | — | — |
| 50 | 100 | 90 | 158.0(50)[3,5] | — | 0.5 | 11.55 | 190 | — | — |
| 50 | 100 | 90 | 67.7(30)[3,5] | — | 0.5 | 12.50 | 745 | — | — |
| 100 | 100 | 100 | 191.4(50)[3,5] | — | 2.0 | 11.75 | 600 | — | — |
| 100 | 100 | 100 | 82.0(30)[3,5] | — | 2.0 | 12.80 | 1,330 | — | — |

[1]Source: Fritz Chemical Company
[2]Drilling fluid type as indicated
[3]Value in parenthesis = percent by volume
[4]Drilling Fluid: 8.8 lb. bentonite/gal. fresh water (30 grams bentonite/350 grams deionized water)
[5]Drilling Fluid: 9.2 lb. partially hydrolyzed polyacrylamide/gal. 8% KCl From Table IV it can again be seen that the cementing compositions of the present invention produce high early compressive strengths at relatively low temperatures.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cementing composition comprising:
   a cement component consisting essentially of a fine particle size ASTM Class C fly ash or the equivalent fly ash wherein the particles are of a size no greater than about 36 microns and have a specific surface area no less than about 1.1 square meters per cubic centimeter; and
   sufficient water to form a slurry.

2. The composition of claim 1 which further comprises a dispersing agent for facilitating the dispersal of said fly ash particles in said water and maintaining said particles in suspension therein.

3. The composition of claim 2 wherein said dispersing agent is selected from the group consisting of the condensation polymer product of acetone, formaldehyde and sodium sulfite, a blend of polyvinylpyrrolidone and the condensate of sodium naphthalene sulfonate with formaldehyde, a blend of a lignosulfonate with polyvinylpyrrolidone and the condensate of sodium naphthalene sulfonate with formaldehyde, gluconic acid delta lactone and naphthalene sulfonic acid.

4. The composition of claim 2 wherein said dispersing agent is comprised of the condensation polymer product of acetone, formaldehyde and sodium sulfite present in said composition in an amount in the range of from about 0.25% to about 1% by weight of said composition.

5. The composition of claim 1 which further comprises a set delaying additive for increasing the time in which said composition sets.

6. The composition of claim 5 wherein said set delaying additive is selected from the group consisting of ammonium and metal lignosulfonate salts, tartaric acid, citric acid, trisodium citrate gluconic acid, potassium pentaborate, potassium perborate, the copolymer 2-acrylamido-2-methyl propyl sulfonic acid and acrylic acid, aminotri(methylene phosphonic acid) and mixtures of two or more of such set delaying additives.

7. The composition of claim 5 wherein said set delaying additive is an ammonium lignosulfonate salt present in said composition in an amount in the range of from about 0.1% to about 4% by weight of said composition.

8. The composition of claim 1 which further comprises a drilling fluid selected from the group consisting of a water base gel drilling fluid and a hydrocarbon base drilling fluid present in said composition in an amount in the range of from about 10% to about 50% by weight of said composition.

9. A fine particle size cementing composition for cementing in a subterranean zone penetrated by a well bore comprising:
  a fine particle size ASTM Class C fly ash or the equivalent fly ash wherein the particles are of a size no greater than about 36 microns and have a specific surface area no less than about 1.1 square meters per cubic centimeter;
  a dispersing agent comprised of the condensation polymer product of acetone, formaldehyde and sodium sulfite present in said composition in an amount in the range of from about 0.25% to about 1% by weight of said fly ash in said composition;
  a drilling fluid selected from the group consisting of a water base gel drilling fluid and a hydrocarbon base drilling fluid present in said composition in an amount in the range of from about 10% to about 50% by weight of said composition; and
  sufficient water to form a pumpable slurry.

10. The composition of claim 9 which further comprises a set delaying additive for increasing the time in which said composition sets.

11. The composition of claim 10 wherein said set delaying additive is an ammonium lignosulfonate salt present in said composition in an amount in the range of from about 0.1% to about 4% by weight of said composition.

12. The composition of claim 9 which further comprises a fine particle size Portland cement wherein the particles are of a size no greater than about 30 microns and have a specific surface area no less than about 1.5 square meters per cubic centimeter present in said composition in an amount in the range of from about 30% to about 100% by weight of said fly ash in said composition.

13. A method of forming a hard substantially impermeable cementitious mass in a desired location comprising the steps of:
  placing a cementing composition in said location comprised of a cement component consisting essentially of a fine particle size ASTM Class C fly ash or the equivalent fly ash wherein the particles are of a size no greater than about 36 microns and have a specific surface area no less than about 1.1 square meters per cubic centimeter and sufficient water to form a slurry; and
  allowing said cementing composition to set into a hard substantially impermeable mass.

14. The method of claim 13 wherein said cementing composition further comprises a dispersing agent for facilitating the dispersal of said fly ash particles in said water and maintaining said particles in suspension therein.

15. The method of claim 14 wherein said dispersing agent is comprised of the condensation polymer product of acetone, formaldehyde and sodium sulfite present in said composition in an amount in the range of from about 0.25% to about 1% by weight of said composition.

16. The method of claim 13 wherein said cementing composition further comprises a set delaying additive for increasing the time in which said composition sets.

17. The method of claim 16 wherein said set delaying additive is an ammonium lignosulfonate salt present in said composition in an amount in the range of from about 0.1% to about 4% by weight of said composition.

18. The method of claim 13 wherein said cementing composition further comprises a drilling fluid selected from the group consisting of a water base gel drilling fluid and a hydrocarbon base drilling fluid present in said composition in an amount in the range of from about 10% to about 50% by weight of said composition.

19. A method of cementing in a subterranean zone penetrated by a well bore comprising the steps of:
  pumping a cementing composition into said zone comprised of a fine particle size ASTM Class C fly ash or the equivalent fly ash wherein the particles are of a size no greater than about 36 microns and have a specific surface area no less than about 1.1 square meters per cubic centimeter, a dispersing agent comprised of the condensation polymer product of acetone, formaldehyde and sodium sulfite present in an amount in the range of from about 0.25% to about 1% by weight of said fly ash in said composition, a drilling fluid selected from the group consisting of a water base gel drilling fluid and a hydrocarbon base drilling fluid present in said composition in an amount in the range of from about 10% to about 50% by weight of said composition, and sufficient water to form a pumpable slurry; and
  allowing said cementing composition to set into a hard substantially impermeable mass in said zone.

20. The method of claim 19 wherein said cementing composition further comprises a set delaying additive comprised of an ammonium lignosulfonate salt present in said composition in an amount in the range of from about 0.1% to about 4% by weight of said composition.

21. The method of claim 19 wherein said cementing composition further comprises a fine particle size Portland cement wherein the particles are of a size no greater than about 30 microns and have a specific surface area no less than about 1.5 square meters per cubic centimeter present in said composition in an amount in the range of from about 30% to about 100% by weight of fly ash in said composition.

22. A method of cementing a well with a cementing composition utilizing a portion of the drilling fluid used to drill the well as a component of the cementing composition comprising the steps of:
  forming a cementing composition comprised of a fine particle size ASTM Class C fly ash or the equivalent fly ash wherein the particles are of a size no greater than about 36 microns and have a specific surface area no less than about 1.1 square meters per cubic centimeter, a dispersing agent comprised of the condensation polymer product of acetone, formaldehyde and sodium sulfite present in an amount in the range of from about 0.25% to about 1% by weight of said fly ash, a drilling fluid selected from the group consisting of a water base gel drilling fluid and a hydrocarbon base drilling fluid present in an amount in the range of from about 10% to about 50% by weight of said composition and sufficient water to form a pumpable slurry;

introducing the resulting cementing composition into said well; and permitting said composition to set into a hard mass in said well.

23. The method of claim 22 wherein said cementing composition further comprises a set delaying additive comprised of an ammonium lignosulfonate salt present in said composition in an amount in the range of from about 0.1% to about 4% by weight of said composition.

24. The method of claim 22 wherein said cementing composition further comprises a fine particle size Portland cement wherein the particles are of a size no greater than about 30 microns and have a specific surface area no less than about 1.5 square meters per cubic centimeter present in said composition in an amount in the range of from about 30% to about 100% by weight of fly ash in said composition.

* * * * *